Figure 1:
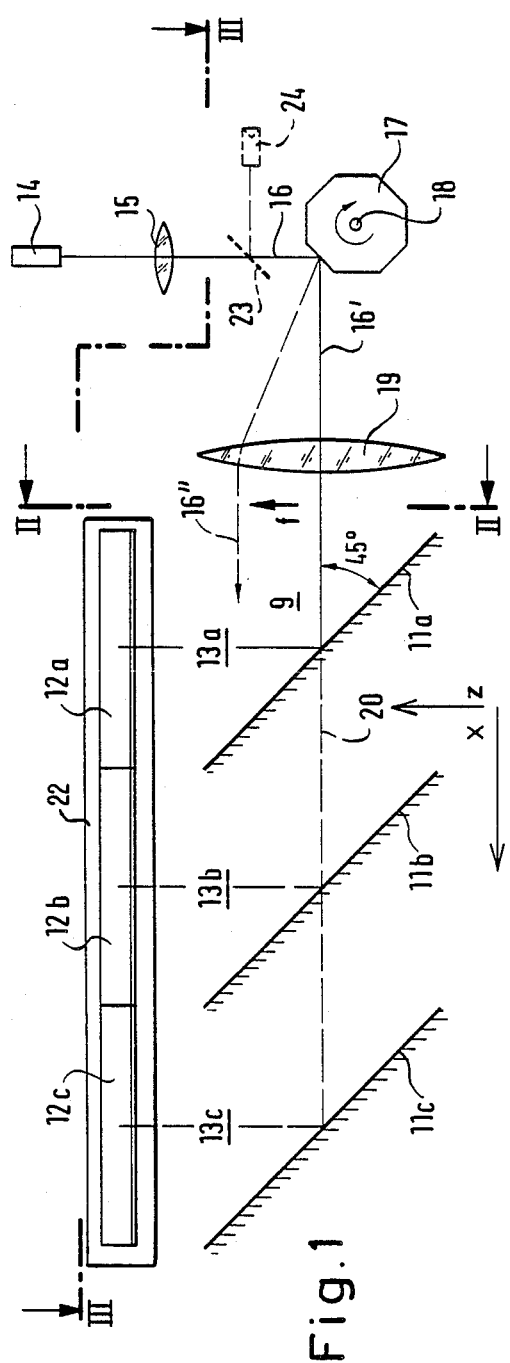

United States Patent [19]
Fetzer

[11] Patent Number: 4,875,761
[45] Date of Patent: Oct. 24, 1989

[54] LIGHT CURTAIN APPARATUS

[75] Inventor: Günter Fetzer, Gundelfingen, Fed. Rep. of Germany

[73] Assignee: Erwin Sick GmbH Optik-Electronik, Waldkirch, Fed. Rep. of Germany

[21] Appl. No.: 109,131

[22] Filed: Oct. 15, 1987

[30] Foreign Application Priority Data
Oct. 16, 1986 [DE] Fed. Rep. of Germany ....... 3635271

[51] Int. Cl.$^4$ .............................................. G02B 26/10
[52] U.S. Cl. ...................................... 350/171; 350/6.8
[58] Field of Search ................. 350/171, 6.5, 6.8, 376, 350/174, 484, 486; 356/376, 375, 380, 387

[56] References Cited
U.S. PATENT DOCUMENTS

| | | | |
|---|---|---|---|
| 4,302,105 | 11/1981 | Sick | 356/237 |
| 4,431,309 | 2/1984 | Sick et al. | 356/431 |
| 4,460,240 | 7/1984 | Hudson | 350/6.8 |
| 4,681,453 | 7/1987 | Sick | 350/6.8 |

FOREIGN PATENT DOCUMENTS

2532602 1/1977 Fed. Rep. of Germany .
2532602C3 5/1979 Fed. Rep. of Germany .

*Primary Examiner*—Bruce Y. Arnold
*Assistant Examiner*—Terry S. Callaghan
*Attorney, Agent, or Firm*—Townsend and Townsend

[57] ABSTRACT

Light from a scanning device is directed onto a row of inclined strip mirrors 11a, 11b, 11c which are arranged one behind the other and laterally displaced relative to each other at an angle of 45° to the incident light beam 16″. The strip mirrors form the incident light into a number of light curtains 13a, 13b, 13c corresponding to the number of mirrors, with the individual light curtains being laterally displaced in the same way as the strip mirrors. The individual light curtains then fall onto a corresponding number of deflecting mirrors 12a, 12b, 12c which are set at an angle of 45° to the incident light curtains. The deflecting mirrors thus deflect the light curtains through an angle 90° and indeed into the same plane so that the undesired lateral displacement is cancelled and a broad light curtain is achieved which extends in a single plane.

4 Claims, 2 Drawing Sheets

LIGHT CURTAIN APPARATUS

The invention relates to a light curtain apparatus comprising a plurality of strip mirrors which are arranged in the x direction behind one another at an angle to a direction of light incidence and are laterally displaced in the y direction; wherein the mirrors deflect the light of a thick light curtain of narrow width, which is incident in the direction of light incidence through an angle of preferably 90° into the z direction and thus form, at said angle, a plurality of light curtains which are arranged laterally displaced behind one another and are correspondingly thin.

In a known light curtain apparatus of this kind (DE-PS No. 25 32 602) a relatively narrow but thick light curtain generated by a Weiler type mirror wheel is split up by the strip mirrors into a number of individual light curtains, corresponding in number to the number of the strip mirrors and of the same width, but correspondingly thinner, which are laterally displaced and arranged behind one another, so that in total a relatively wide monitoring range is achieved.

The embodiment of FIGS. 5 and 6 of the patent specification No. 25 32 602 is particularly preferred since in this way a broad overall light curtain is obtained without gaps, but is however composed of individual light curtains which are laterally displaced relative to one another.

This lateral displacement of the narrow individual light curtains which form the total light curtain can be disturbing for various applications. If for example a light conducting rod is used to receive the light from the light curtain then the receiving aperture of the light conducting rod must be made so large that light coming from all the laterally displaced narrow light curtains can still be picked up. This requires very massive light conducting rods of large diameter. In the case of an autocollimation device the retroreflector provided at the end of the monitored path must be made broader.

The use of a continuous cylindrical lens for light collection is also a problem with such light curtains if the cylindrical lens does not likewise have the large aperture made necessary by the lateral displacement.

The object underlying the present invention is not to provide a light curtain apparatus of the initially named kind in which the lateral displacement of the individual narrow and thin light curtains arranged behind one another is avoided.

In order to satisfy this object the invention provides that (a) a respective deflecting mirror is associated with each strip mirror,
(b) the deflecting mirrors are arranged in planes parallel to one another and are displaced in the y direction in just the same way as the strip mirrors, but are not displaced in the z direction, and
(c) the normal to the surface of each deflecting mirror forms a respctive angle of 45° with the z direction and indeed in each case in a plane parallel to the y-z plane, whereby the deflecting mirrors deflect the individual light curtains incident thereon, which are displaced in accordance with the displacement of said strip mirrors, into a common plane for transmission through a monitoring range, thus eliminating the displacement of the light curtains arising from said displacement of said strip mirrors.

The thought underlying the invention is thus to be seen in the fact that the light of the individual narrow and thin light curtains is deflected through 90° out of the planes of the thin light curtains whereby the light rays of all the light curtains are directed into one and the same plane so that a continuous overall light curtain is obtained. This continuous light curtain indeed consists of narrow and thin individual light curtains which are arranged together in accordance with the number of the strip mirrors, however, the lateral displacement of the individual light curtains is completely eliminated. Any desired small lateral displacements of the adjacent light curtains can also be consciously realized by inclining the deflecting mirrors at an angle somewhat different from 45° to the plane of the associated narrow and thin light curtains.

In a particularly preferred arrangement the deflecting mirrors which are further removed from the light inlet are disposed closer to the monitoring range than the deflecting mirrors which are provided in the region of the light inlet.

This arrangement ensures that the differences in length of the light beams which extend via the individual strip mirrors and deflecting mirrors are kept to a minimum.

Figure 3:
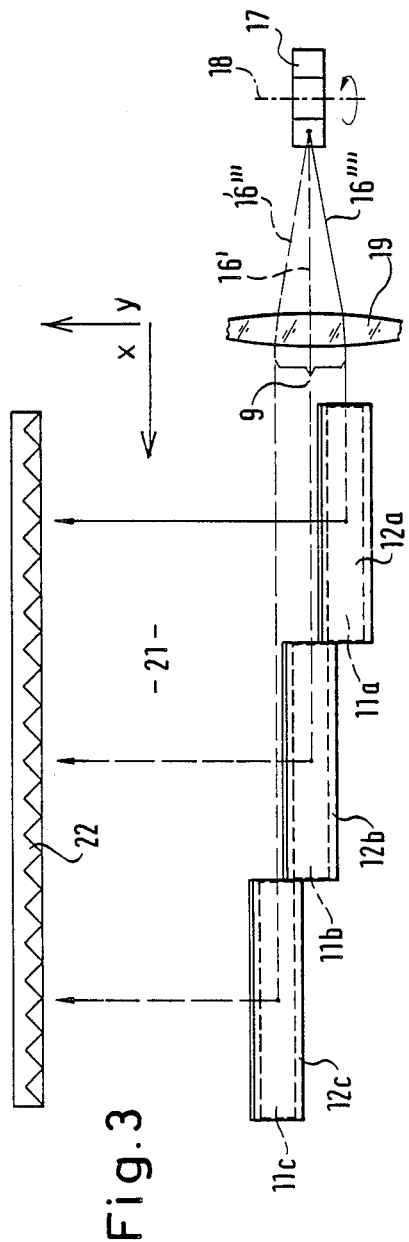
Figure 2:
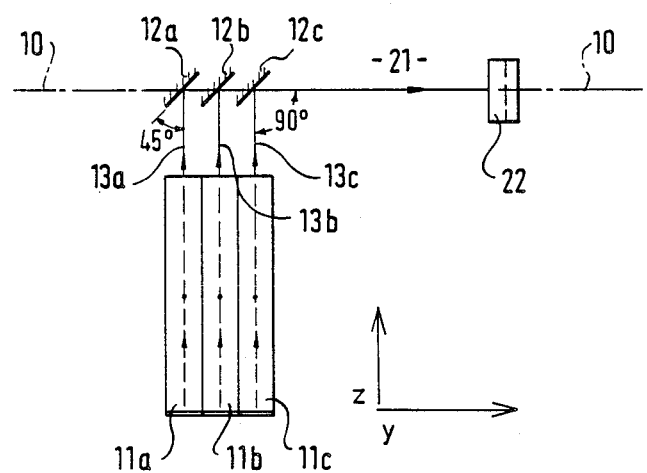

The invention will be described in the following by way of example and with reference to the drawing in which are shown:

FIG. 1 a schematic side view of a light curtain apparatus which operates with a Weiler type mirror wheel, FIG. 2 a view on the line II—II of FIG. 1, and FIG. 3 a view on the line III—III in FIG. 1.

As seen in the drawing a light source, for example a laser 14, generates a sharply bundled light beam 16 via a suitable optical system 15 which impinges on a mirror wheel 17 perpendicular to its axis of rotation 18. The mirror wheel deflects the incident light beam 16 in accordance with Figs. 1 and 3 to a lens 19 the focal point of which is arranged on the reflecting surface of the mirror wheel 17. On rotation of the mirror wheel 17 in the direction of the arrow the reflected laser beam 16' scans across the aperture of the lens 19 in the z direction. In this way a scanning beam 16" which is displaced parallel to itself and to the optical axis 20 is generated in the x direction.

As seen in FIG. 3 the mirror wheel that is used is a Weiler type mirror wheel in which the sequential mirror surfaces do not all lie parallel to the axis of rotation 18 but are instead tilted in sequence by a greater or lesser degree relative to the axis of rotation so that only some mirror surfaces reflect the incident light beam 16 (FIG. 1) into the plane of the drawing of FIG. 1 as a beam 16'. Other mirror surfaces reflect the incident light beam 16 in one or other direction somewhat out of the plane of the drawing in FIG. 1, which is indicatd in FIG. 3 by the side beams 16''' and 16''''. The parallel light beams which emerge from the lens 19 thus form a thick but narrow total light curtain 9 which consists of a plurality of thin partial light curtains which lie alongside one another in the view of FIG. 3. The thin partial light curtains of the thick light curtain 9 generated by the individual differentially inclined mirror surfaces are received by plane strip mirrors 11a, 11b and 11c, respectively which are arranged behind one another in the x direction and laterally displaced in the y direction(- FIGS. 2,3), with the strip mirrors being arranged at 45° to the optical axis 20 and deflecting the incident light beams through 90°.

In this manner three thin laterally displaced light curtains 13a, 13b and 13c are formed behind one another in FIGS. 1 and 2.

As seen in FIGS. 1 and 2 appropriately dimensioned plane deflecting mirrors 12a, 12b and 12c are arranged above the strip mirrors 11a, 11b and 11c, respectively parallel to one another and to the optical axis 20. The plane deflecting mirrors extend with their longitudinal direction parallel to the narrow thin light curtains 13a, 13b, 13c and are arranged relative to the plane of the thin light curtain 13a, 13b, 13c at an angle of 45°. In this way the light beams deflected at each of the deflecting mirrors 12a, 12b and 12c are directed into one under same plane 10 (FIG. 2) so that the lateral displacement which is initially present is completely eliminated. Thus a broad light curtain is formed without displacement of its individual parts in the plane 10 and can be directed through a monitoring region 21 in the plane 10 to a device such as the strip like retroreflector 22 shown in the illustrated embodiment. That is to say a monitoring region extends between the deflecting mirrors 12a, 12b and 12c and the retroreflector 22. The retroreflector 22 then reflects the incident light beams back on themselves and they return to the mirror wheel 17 via the same path by which they have arrived, but in the reverse direction. From the mirror wheel 17 the returned light beams can be deflected to a photoreceiver 24, for example by a partially transmitting mirror 23 arranged in the transmitted beam.

A light conducting rod or some other form of light receiving apparatus can however also be provided in place of the retroreflector 22.

Despite the use of laterally displaced strip mirrors 11a, 11b and 11c, which are necessary to provide an extended light curtain, one nevertheless achieves an overall light curtain which is free of displacement in the monitoring region 21.

It is of significance that the deflecting mirrors 12a, 12b, 12c are inclined in the illustration of FIG. 2 at an angle of 45° to the thin light curtain 13a, 13b and 13c, respectively, so that the reflected light rays extend in one common plane to the right to the retroreflector 22 which is arranged there. As can be seen from FIG. 3 the light path from the deflecting mirror 12c which is furthest removed from the lens 19 to the retroreflector 22 is smaller than the corresponding light path from the deflecting mirror 12a which is closest to the lens 19. In this way a certain compensation can take place for the dissimilar lengths of the light paths from the lens 19 to the retroreflector 22.

While FIGS. 1-3 illustrate a light curtain apparatus having three plane strip mirrors (11a, 11b, 11c) and three corresponding deflecting mirrors (12a, 12b, 12c), it is to be understood that the number of plane strip mirrors and deflecting mirrors may be less than or greater than three. FIGS. 1, 2 and 3 show only three mirrors for the sake of simplicity in understanding the invention.

I claim:

1. In a three dimensional cartesian space having mutually orthogonal x, y and z directions, a light curtain apparatus for generating a relatively broad, relatively thin light curtain, lying in a single plane, from a relatively narrow, relatively thick light curtain, and for directing said generated light curtain through a monitored region, the apparatus comprising:

means for projecting a light curtain in the x direction, said light curtain having a width extending in the z direction and a thickness extending in the y direction;

a plurality of strip mirrors, arranged one strip mirror behind another in the x direction at an angle to the x direction, each strip mirror being laterally displaced in the y direction relative to a preceding strip mirror, each strip mirror reflecting a full width of the projected light curtain but only a portion of the thickness thereof through an angle of substantially 90 degrees into said z direction, forming thereby a plurality of reflected light curtain portions arranged in a row extending in the x direction, each said reflected light curtain portion being laterally displaced in the y direction relative to a preceding reflected light curtain portion, a total width of a row of reflected light curtain portions in the z direction corresponding to a width of said projected light curtain multiplied by the number of said strip mirrors;

a plurality of strip-like deflecting mirrors, each said deflecting mirrors extending in the x direction;

a respective strip-like deflecting mirror being associated with each said strip mirrors;

said strip-like deflecting mirrors being arranged in planes parallel to one another and displaced in the y direction in the manner of said strip mirrors, said striplike deflecting mirrors having no displacement in the z direction;

each said deflecting mirror having a normal to its surface, each said normal forming a respective angle of 45 degrees with the z direction, and in a plane parallel to a plane defined by said y and z directions; and whereby said deflecting mirrors deflect individual reflected light curtain incident thereon, which are displaced in accordance with the displacement of the first said strip mirrors, into a common plane parallel to a plane defined by the x and y directions, for transmission through said monitoring region as said relatively broad and relatively thin light curtain, thereby eliminating displacement of the reflected light curtains resulting from said lateral displacement of said first strip mirrors.

2. A light curtain apparatus according to claim 1, wherein said means for projecting a light curtain in the x direction includes a mirror wheel situated substantially at a focal point of a convex lens;

a retroreflector being disposed at a side of said monitored region opposite said deflecting mirrors, the deflecting mirror furthest removed from said convex lens being disposed closer to said retroreflector than the deflecting mirror situated closest to said convex lens.

3. A light curtain apparatus according to claim 1, further including:

a convex lens having a focal point, disposed to cause light passing through said lens to fall upon said plane strip mirrors; and a retroreflector disposed at a side of said monitored region opposite said deflecting mirrors;

said means for projecting a light curtain in the x direction including a mirror wheel situated substantially at said focal point of said convex lens;

the deflecting mirror situated most distant from said convex lens being disposed closer to said retroreflector than the deflecting mirror situated closest to said convex lens.

4. A light curtain apparatus according to claim 1, further including:

a light receiver being arranged at a side of said monitored region opposite said deflecting mirrors;

and wherein said means for projecting includes a mirror wheel situated substantially at a focal point of a convex lens;

the deflecting mirror furthest removed from said convex lens being disposed closer to said light receiver than the deflecting mirror situated closest to said convex lens.

* * * * *